(12) United States Patent
Wu et al.

(10) Patent No.: US 9,904,411 B2
(45) Date of Patent: Feb. 27, 2018

(54) METHOD AND SYSTEM FOR SENSING WATER, DEBRIS OR OTHER EXTRANEOUS OBJECTS ON A DISPLAY SCREEN

(71) Applicant: RAKUTEN KOBO, INC., Toronto (CA)

(72) Inventors: James Wu, Newmarket (CA); Robert Beghian, Toronto (CA); George Talusan, Toronto (CA); Paul McDougall, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 0 days.

(21) Appl. No.: 14/498,661

(22) Filed: Sep. 26, 2014

(65) Prior Publication Data

US 2016/0092009 A1    Mar. 31, 2016

(51) Int. Cl.
*G06F 3/041* (2006.01)

(52) U.S. Cl.
CPC .. *G06F 3/0418* (2013.01); *G06F 2203/04104* (2013.01)

(58) Field of Classification Search
CPC ................................ G06F 3/041; G06F 3/044
USPC ........................................................ 345/173
See application file for complete search history.

(56) References Cited

U.S. PATENT DOCUMENTS

| 4,868,912 | A  | * | 9/1989 | Doering | ................ | G06F 3/0421 |
| | | | | | | 250/221 |
| 6,730,863 | B1 | * | 5/2004 | Gerpheide | .............. | G06F 3/044 |
| | | | | | | 178/18.02 |
| 2007/0152976 | A1 | * | 7/2007 | Townsend | ............. | G06F 3/0416 |
| | | | | | | 345/173 |
| 2012/0133579 | A1 | * | 5/2012 | Prieur | ..................... | G06F 3/017 |
| | | | | | | 345/156 |
| 2012/0293447 | A1 | * | 11/2012 | Heng | .................... | G06F 3/0418 |
| | | | | | | 345/174 |
| 2013/0201160 | A1 | | 8/2013 | Ito et al. | | |

(Continued)

FOREIGN PATENT DOCUMENTS

| JP | 2003-15779 | A | 1/2003 |
| JP | 2013-222283 | A | 10/2013 |
| WO | WO 2014/092038 | A1 | 6/2014 |

OTHER PUBLICATIONS

International Search Report and Written Opinion of the International Searching Authority dated Dec. 15, 2015 in PCT/JP2015/004913.

*Primary Examiner* — Viet Pham
(74) *Attorney, Agent, or Firm* — Oblon, McClelland, Maier & Neustadt, L.L.P.

(57) ABSTRACT

A computing device includes a housing and a display assembly having a screen. The housing at least partially circumvents the screen so that the screen is viewable and a set of touch sensors are provided with the display assembly. A processor is provided within the housing to detect a plurality of interactions with the set of touch sensors. The processor further determines, based on the plurality of interactions, a presence of extraneous objects on a surface of the screen of the display assembly. More specifically, the processor may determine that the screen is wet if three or more interactions are detected, concurrently, via the set of touch sensors and/or a contact duration associated with each of the plurality of interactions exceeds a threshold duration.

24 Claims, 7 Drawing Sheets

(56) References Cited

U.S. PATENT DOCUMENTS

| | | | |
|---|---|---|---|
| 2013/0207935 A1* | 8/2013 | Toda | G06F 3/044 345/174 |
| 2014/0092033 A1* | 4/2014 | Chang | G06F 3/0418 345/173 |
| 2014/0146070 A1 | 5/2014 | Liu et al. | |
| 2014/0306924 A1* | 10/2014 | Lin | G06F 3/0418 345/174 |
| 2015/0268786 A1 | 9/2015 | Kitada | |

* cited by examiner

METHOD AND SYSTEM FOR SENSING WATER, DEBRIS OR OTHER EXTRANEOUS OBJECTS ON A DISPLAY SCREEN

TECHNICAL FIELD

Examples described herein relate to a computing device that detects the presence of water and/or other extraneous objects on the surface of a display of a computing device.

BACKGROUND

An electronic personal display is a mobile computing device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such as (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

Some electronic personal display devices are purpose built devices that are designed to perform especially well at displaying readable content. For example, a purpose built purpose build device may include a display that reduces glare, performs well in high lighting conditions, and/or mimics the look of text on actual paper. While such purpose built devices may excel at displaying content for a user to read, they may also perform other functions, such as displaying images, emitting audio, recording audio, and web surfing, among others.

There also exists numerous kinds of consumer devices that can receive services and resources from a network service. Such devices can operate applications or provide other functionality that links a device to a particular account of a specific service. For example, e-reading devices typically link to an online bookstore, and media playback devices often include applications which enable the user to access an online media library. In this context, the user accounts can enable the user to receive the full benefit and functionality of the device.

DETAILED DESCRIPTION

Figure 1:
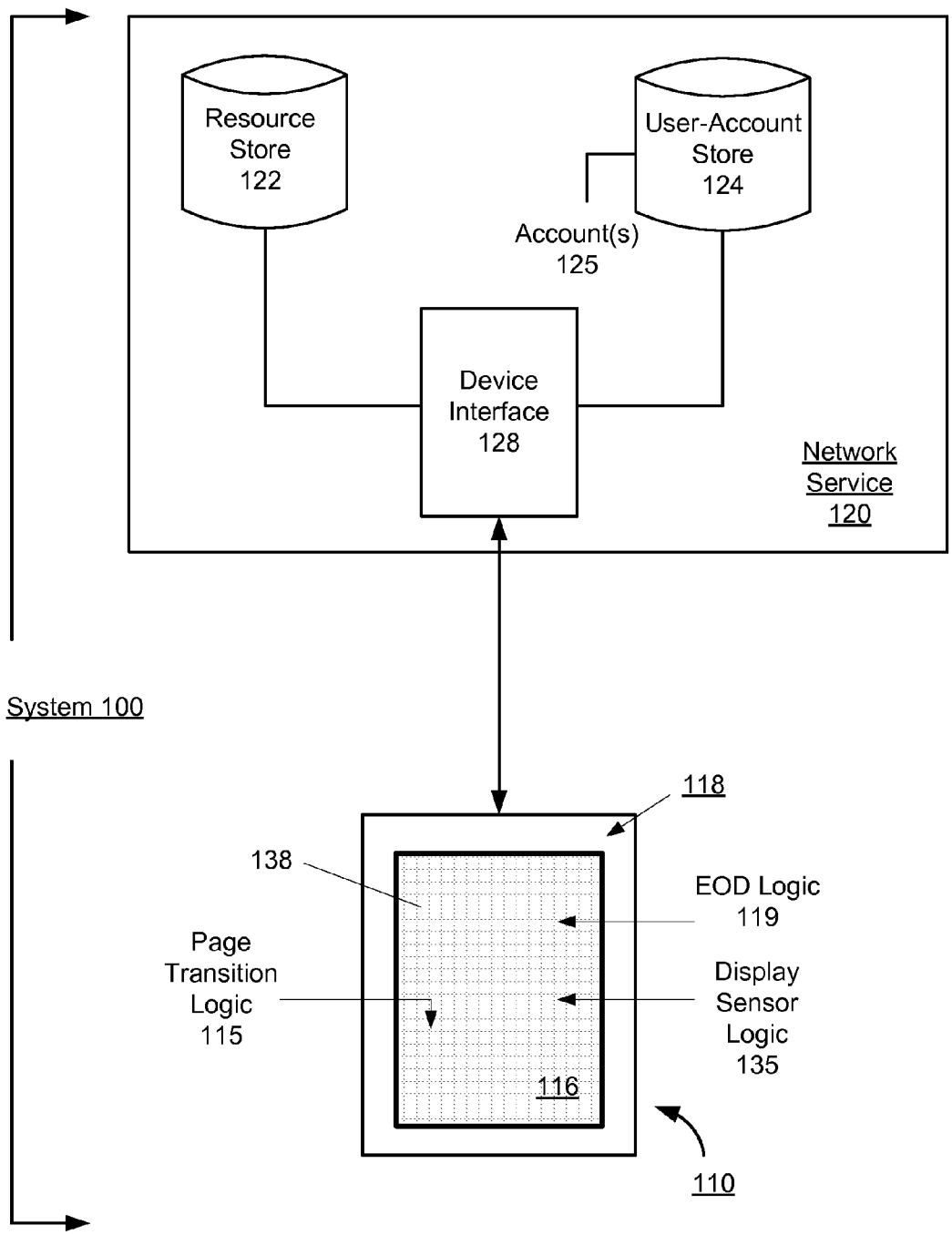
FIG. 1 illustrates a system for utilizing applications and providing e-book services on a computing device, according to an embodiment.

Embodiments described herein provide for a computing device that can detect the presence of water and debris (or other persistent objects) on the surface of a display of the computing device. More specifically, the computing device may determine that the surface of the display is we based on the detection of a plurality of interactions with touch sensors provided with the display. For example, the computing device may determine that the display surface is we if multiple interactions (e.g., three or more touch-based contacts) are detected, concurrently, and at least one of the interactions is a persistent interaction (e.g., contact with at least one of the touch sensors is continuously maintained for a threshold duration).

The computing device may respond to water detection, for example, by adjusting one or more device settings (e.g., a display state, device configurations, and/or input responses). The adjustments made by the computing device include performing operations to maintain viewability of content appearing on the display screen. As an addition or variation, the computing device may respond by implementing operations to maintain a usability or functionality of the display screen.

According to some embodiments, a computing device includes a housing and a display assembly having a screen. The housing at least partially circumvents the screen so that the screen is viewable and a set of touch sensors are provided with the display assembly. A processor is provided within the housing to detect a plurality of interactions with the set of touch sensors. The processor further determines, based on the plurality of interactions, that the screen of the display assembly is wet. For some embodiments, the processor may then adjust one or more settings of the computing device in response to determining that the screen is wet. For example, the one or more settings may include a set of actions to be performed by the processor in response to subsequent interactions with the set of touch sensors.

For some embodiments, the processor may determine a number of interactions that are detected, concurrently, via the set of touch sensors. The processor may further determine that the screen is we based, at least in part, on the number of interactions that are concurrently detected via the set of touch sensors. For example, the processor may determine that the screen is we if three or more interactions are detected, concurrently, via the set of touch sensors. More specifically, the three or more interactions may be detected via respective touch sensors positioned at distinct regions of the display assembly.

Further, for some embodiments, the processor may determine a contact duration associated with each of the plurality of interactions. Specifically, each contact duration may represent a length of time for which a corresponding object is in continuous contact with a particular region of the screen when interacting with the set of touch sensors. The processor may further determine that the screen is we based, at least in part, on the contact duration associated with each of the plurality of interactions. For example, the processor may determine that the screen is we if the contact duration for at least one of the plurality of interactions exceeds a threshold duration.

Among other benefits, examples described herein enable a personal display device, such as an e-reading device, to detect that its display surface is we and to adjust one or more device settings accordingly. The presence of water drops, smears and/or splashes on the surface of a display screen of an e-reading device may inhibit or otherwise impede one or more functions of the device. For example, the water may be falsely interpreted as a user "touch" input by one or more touch sensors provided with the display. This may cause the computing device to malfunction (e.g., perform undesired actions) and/or prevent the device from responding to actual (e.g., desired) user inputs. Therefore, the e-reading device may adjust one or more device settings, in response to detecting that the display surface is wet, in order to prevent the device from malfunctioning and/or to enable a user to continue operating the device even with the water present.

"E-books" are a form of electronic publication that can be viewed on computing device with suitable functionality. An e-book can correspond to a literary work having a pagination format, such as provided by literary works (e.g., novels) and periodicals (e.g., magazines, comic books, journals, etc.). Optionally, some e-books may have chapter designations, as well as content that corresponds to graphics or images (e.g., such as in the case of magazines or comic books). Multifunction devices, such as cellular-telephony or messaging devices, can utilize specialized applications (e.g., e-reading apps) to view e-books. Still further, some devices (sometimes labeled as "e-readers") can be centric towards content viewing, and e-book viewing in particular.

An "e-reading device" can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet device, an ultramobile computing device, or a wearable computing device with a form factor of a wearable accessory device (e.g., smart watch or bracelet, glasswear integrated with a computing device, etc.). As another example, an e-reading device can include an e-reading device, such as a purpose-built device that is optimized for an e-reading experience (e.g., with E-ink displays).

One or more embodiments described herein provide that methods, techniques and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System Description

FIG. 1 illustrates a system 100 for utilizing applications and providing e-book services on a computing device, according to an embodiment. In an example of FIG. 1, system 100 includes an electronic display device, shown by way of example as an e-reading device 110, and a network service 120. The network service 120 can include multiple servers and other computing resources that provide various services in connection with one or more applications that are installed on the e-reading device 110. By way of example, in one implementation, the network service 120 can provide e-book services which communicate with the e-reading device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to the network service 120 and enables e-books provided through the service to be viewed and consumed. In another implementation, the e-reading device 110 can run a media playback or streaming application that receives files or streaming data from the network service 120. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 120 can include a device interface 128, a resource store 122 and a user account store 124. The user account store 124 can associate the e-reading device 110 with a user and with an account 125. The account 125 can also be associated with one or more application resources (e.g., e-books), which can be stored in the resource store 122. The device interface 128 can handle requests from the e-reading device 110, and further interface the requests of the device with services and functionality of the network service 120. The device interface 128 can utilize information provided with a user account 125 in order to enable services, such as purchasing downloads or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

With reference to an example of FIG. 1, e-reading device 110 can include a display screen 116 and a housing 118. In an embodiment, the display screen 116 is touch-sensitive, to process touch inputs including gestures (e.g., swipes). For example, the display screen 116 may be integrated with one or more touch sensors 138 to provide a touch sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116. Additionally, the housing 118 can also be integrated with touch sensors to provide one or more touch sensing regions, for example, on the bezel and/or back surface of the housing 118.

According to some embodiments, the e-reading device 110 includes display sensor logic 135 to detect and interpret user input made through interaction with the touch sensors 138. By way of example, the display sensor logic 135 can detect a user making contact with the touch sensing region of the display screen 116. More specifically, the display sensor logic 135 can detect taps, multiple taps, and/or gestures made through user interaction with the touch sensing region of the display screen 116. Furthermore, the display sensor logic 135 can interpret such interactions in a variety of ways. For example, each interaction may be interpreted as a particular type of user input corresponding with a change in state of the display 116.

For some embodiments, the display sensor logic 135 may interpret simultaneous contact with multiple touch sensors 138 as a type of non-user input. For example, the multi-sensor contact may be provided, in part, by water and/or other unwanted or persistent objects (e.g., dirt, debris, etc.) interacting with the touch sensors 138. Specifically, the e-reading device 110 may include extraneous object detection logic 119 to determine, based on the multi-sensor contact, that the display screen 116 is we (and/or dirty). The display sensor logic 135 may then adjust one or more settings of the e-reading device 110 to account for the presence of water and/or other extraneous objects being in contact with the display screen 116. For example, upon determining that the display screen 116 is wet, the display sensor logic 135 may power off the e-reading device 110 to prevent malfunctioning and/or damage to the device 110. Alternatively, and/or in addition, the display sensor logic 135 may reconfigure the e-reading device 110 to respond (e.g., and/or not respond) to particular types of interactions that are subsequently detected via the touch sensors 138. This enables a user to continue operating the e-reading device 110 even with the water (and/or other undesired objects) present on the display screen 116.

In some embodiments, the e-reading device 110 includes features for providing functionality related to displaying paginated content. The e-reading device 110 can include page transitioning logic 115, which enables the user to transition through paginated content. The e-reading device 110 can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch sensing region of the display screen 116. For example, the user may swipe the surface of the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state. For example, a user can touch and hold the surface of the display screen 116 in order to cause a cluster or chapter page state transition, while a tap in the same region can effect a single page state transition (e.g., from one page to the next in sequence). In another example, a user can specify page turns of different kinds or magnitudes through single taps, sequenced taps or patterned taps on the touch sensing region of the display screen 116.

Hardware Description

Figure 2:
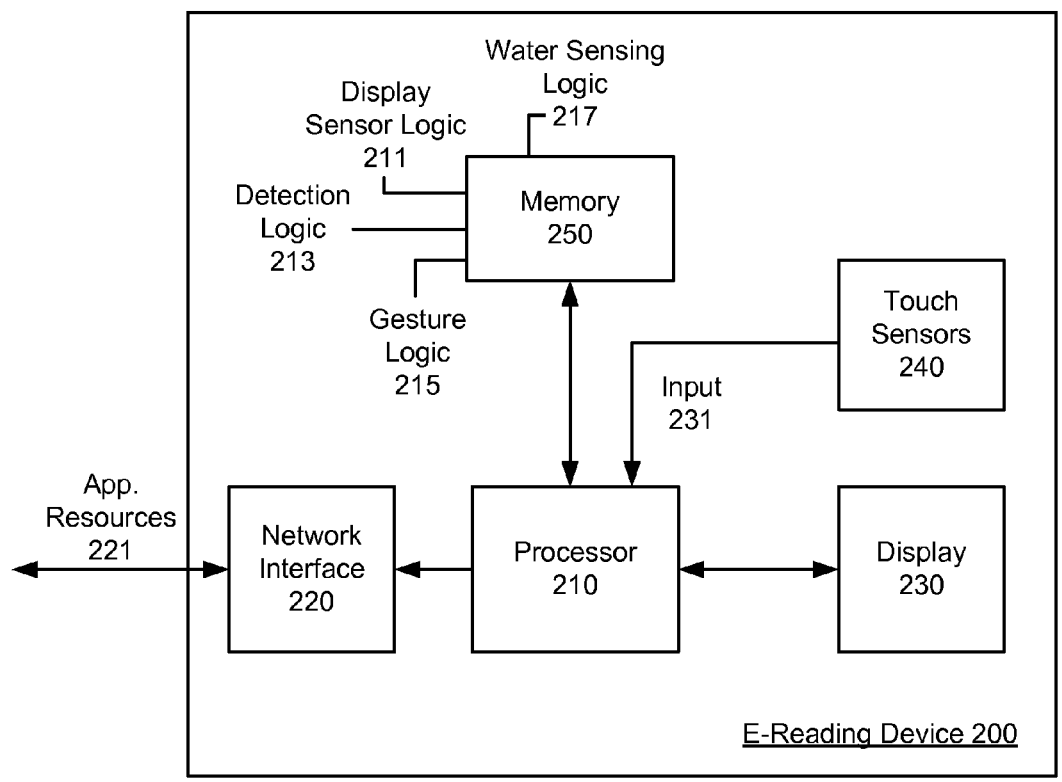
FIG. 2 illustrates an example of an e-reading device or other electronic personal display device, for use with one or more embodiments described herein.

FIG. 2 illustrates an example of an e-reading device 200 or other electronic personal display device, for use with one or more embodiments described herein. In an example of FIG. 2, an e-reading device 200 can correspond to, for example, the device 110 as described above with respect to FIG. 1. With reference to FIG. 2, e-reading device 200 includes a processor 210, a network interface 220, a display 230, one or more touch sensor components 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reading device 200 can access the network service 120 to receive various kinds of resources (e.g., digital content items such as e-books, configuration files, account information), as well as to provide information (e.g., user account information, service requests etc.). For example, e-reading device 200 can receive application resources 221, such as e-books or media files, that the user elects to purchase or otherwise download from the network service 120. The application resources 221 that are downloaded onto the e-reading device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. For example, in some embodiments, one or more of the touch sensor components 240 may be integrated with the display 230. In other embodiments, the touch sensor components 240 may be provided (e.g., as a layer) above or below the display 230 such that individual touch sensor components 240 track different regions of the display 230. Further, in some variations, the display 230 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including the touch sensor components 240, the display 230, and/or other input mechanisms (e.g., buttons, keyboard, mouse, microphone, etc.). With reference to examples described herein, the processor 210 can respond to input 231 from the touch sensor components 240. In some embodiments, the processor 210 responds to inputs 231 from the touch sensor components 240 in order to facilitate or enhance e-book activities such as generating e-book content on the display 230, performing page transitions of the e-book content, powering off the device 200 and/or display 230, activating a screen saver, launching or closing an application, and/or otherwise altering a state of the display 230.

In some embodiments, the memory 250 may store display sensor logic 211 that monitors for user interactions detected through the touch sensor components 240, and further processes the user interactions as a particular input or type of input. In an alternative embodiment, the display sensor logic 211 may be integrated with the touch sensor components 240. For example, the touch sensor components 240 can be provided as a modular component that includes integrated circuits or other hardware logic, and such resources can provide some or all of the display sensor logic 211 (see also display sensor logic 135 of FIG. 1). For example, integrated circuits of the touch sensor components 240 can monitor for touch input and/or process the touch input as being of a particular kind. In variations, some or all of the display sensor logic 211 may be implemented with the processor 210 (which utilizes instructions stored in the memory 250), or with an alternative processing resource.

In one implementation, the display sensor logic 211 includes detection logic 213 and gesture logic 215. The detection logic 213 implements operations to monitor for the user contacting a surface of the display 230 coinciding with a placement of one or more touch sensor components 240. The gesture logic 215 detects and correlates a particular gesture (e.g., pinching, swiping, tapping, etc.) as a particular type of input or user action. The gesture logic 215 may also detect directionality so as to distinguish between, for example, leftward or rightward swipes.

For some embodiments, the display sensor logic 211 further includes water sensing logic 217 for detecting the presence of water (and/or other extraneous objects) on the surface of the display 230. More specifically, the water sensing logic 217 may determine that water is present on the surface of the display 230 based on detected interactions with the touch sensors 240. The water sensing logic 217 may determine that water is present on the display 230 based on a number of touch-based interactions detected via the touch sensors 240 and/or a contact duration (e.g., a length of time for which contact is maintained with a corresponding touch sensor 240) associated with each interaction. In variations, the water sensing logic 217 can detect other forms of extraneous objects such as dirt and debris.

It should be noted that e-reading device 200 is typically able to process only a finite set of known interactions or gestures (e.g., pinching, swiping, tapping, etc.) as user inputs. Thus, the water sensing logic 217 may be triggered if the touch sensors 240 detect an interaction that falls outside of the set of known gestures (e.g., the gesture logic 215 is unable to correlate the interaction with a particular user input). For example, if the set of known gestures includes only single-contact gestures (e.g., single finger taps, single finger swipes, etc.), any multi-contact interaction (e.g., wherein two or more touch sensors 240 are concurrently activated) may trigger execution of the water sensing logic 217. More specifically, when a multi-contact interaction is detected, at least one of the interactions may be attributable to water (and/or other extraneous objects) contacting the surface of the display 230 (and thus interacting with one of the touch sensors 240). Thus, for some embodiments, the water sensing logic 217 may determine whether the display 230 is we based on the number of simultaneous interactions detected via the touch sensors 240. For example, the greater the number of simultaneous interactions detected (e.g., three or more), the greater the likelihood that the water sensing logic 217 will determine that the surface of the display 230 is wet.

It is also noted that water tends to persist in the same region on the surface of the display 230 (e.g., until it evaporates or is wiped off). The presence of water may therefore cause one or more of the touch sensors 240 to remain active (e.g., detect "touch" or contact) for longer durations than the touch sensors 240 would typically experience in response to user-initiated interactions (e.g., tapping, swiping, or even tapping and holding). Thus, for some embodiments, the water sensing logic 217 may determine whether the display 230 is we based on the contact duration associated with each interaction. For example, the longer the contact duration (e.g., greater than a threshold duration), that the water sensing logic 217 will determine that the surface of the display 230 is wet.

For some embodiments, the water sensing logic 217 may determine that the display 230 is we based on a combination of factors including, for example, the number of simultaneous interactions detected via the touch sensors 240 and the contact duration associated with each interaction. In some instances, a user operating the e-reading device 200 may inadvertently touch the surface of the display 230 with multiple fingers (e.g., thus triggering a multi-contact detection via the touch sensors 240). In other instances, the e-reading device 200 may be configured to interpret tap-and-hold interactions as a particular type of user input (e.g., wherein the contact duration corresponds with a magnitude of the input). Therefore, in order to prevent false-positive determinations, the water sensing logic 217 may determine that the display 230 is we only if the contact duration associated with at least one of multiple concurrent interactions is greater than a threshold duration.

Still further, for some embodiments, the water sensing logic 217 may adjust one or more settings of the e-reading device 200 in response to determining that the display 230 is wet. More specifically, the water sensing logic 217 may perform one or more operations to mitigate or overcome the presence of water, debris and/or other extraneous objects on the surface of the display 230. Thus, the water sensing logic 217 can alternatively sense debris and/or other extraneous objects. For example, the water sensing logic 217 may power off the display 230 and/or other hardware components of the device 200 to prevent malfunctions and/or damage (e.g., short-circuiting) to the e-reading device 200. Alternatively, and/or in addition, the water sensing logic 217 may after one or more device configurations (e.g., such as disabling or deactivating one or more touch sensors 240 that coincide with a region of the display 230 on which the water is present) to enable the e-reading device 200 to be continuously operable even while the display 230 is we (e.g., droplets exist on the surface). Still further, in some embodiments, the water sensing logic 217 may reconfigure one or more input responses of the gesture logic 215 (e.g., by disabling recognition of certain gestures and/or enabling a new set of gestures to be recognized by the gesture logic 215) to adapt to the presence of water on the surface of the display 230. Such embodiments are discussed in greater detail, for example, in co-pending U.S. patent application Ser. No. 14/498,722, titled "Method and System for Mobile Device Splash Mode Operation and Transition Thereto," filed Sep. 26, 2014, which is hereby incorporated by reference in its entirety.

Input-Based Water Detection

Figure 3A:
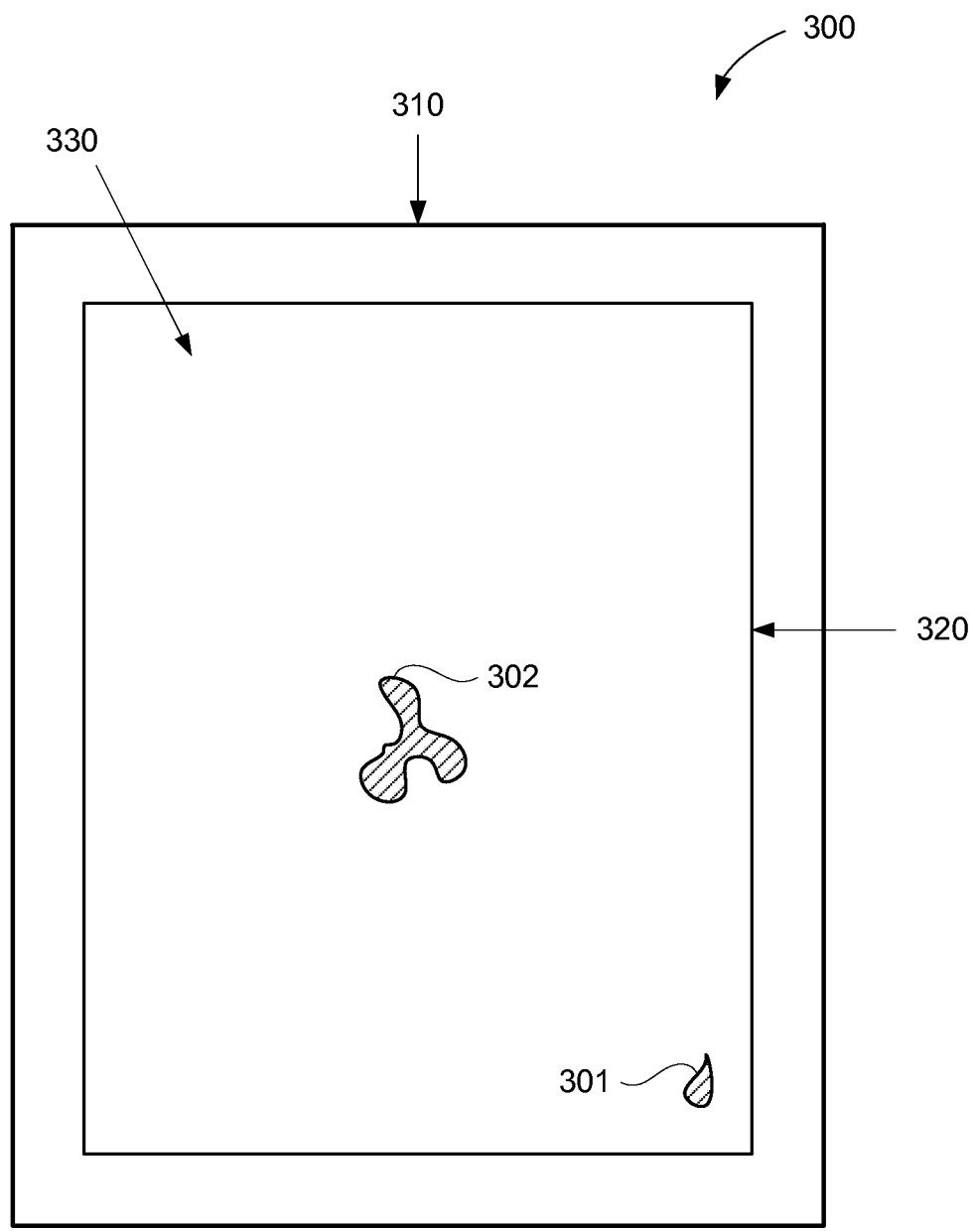
FIG. 3A and FIG. 3B illustrate embodiments of an e-reading device 300 capable of detecting water, debris or other extraneous objects, in accordance with some embodiments.
Figure 3B:
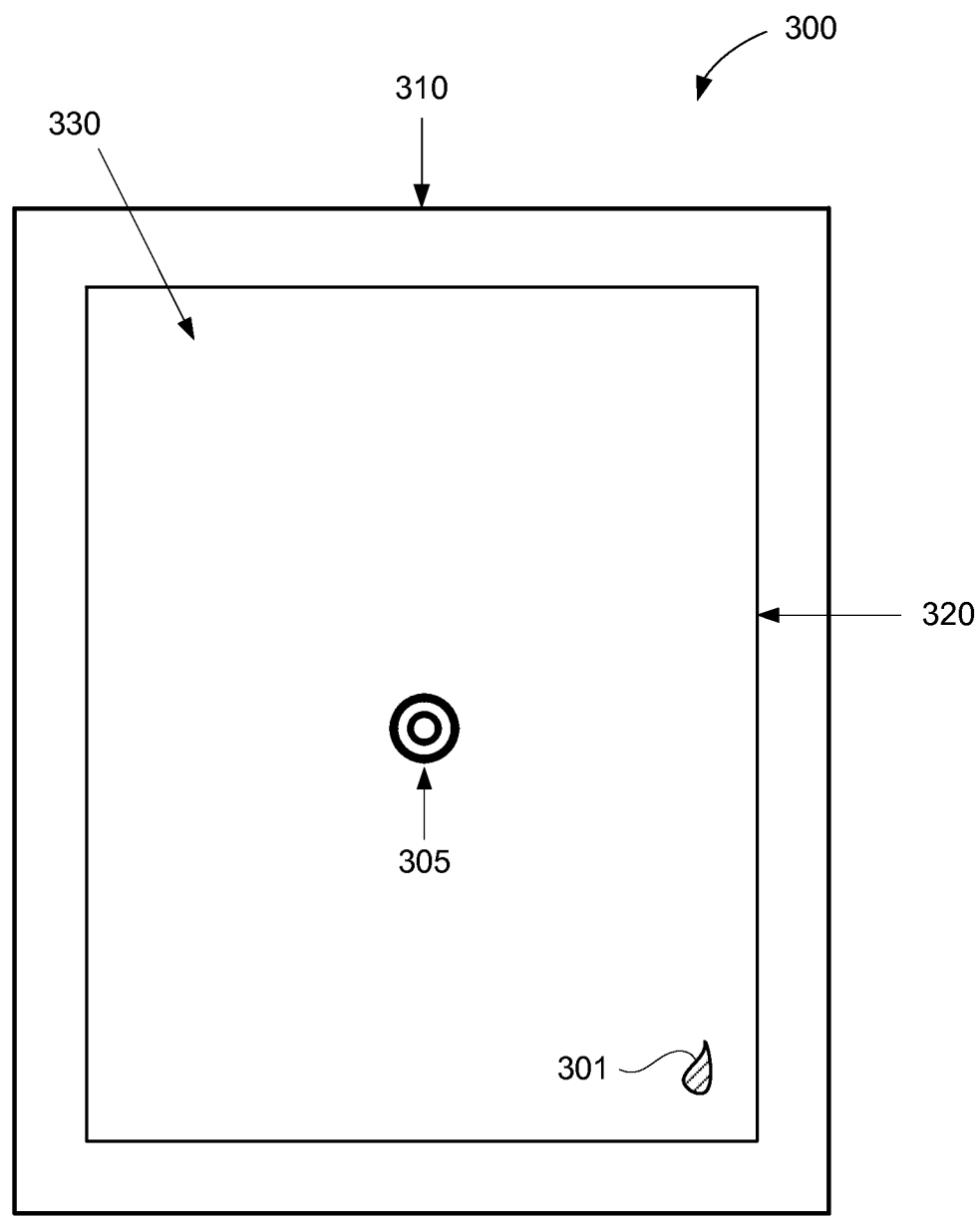

FIG. 3A and FIG. 3B illustrate embodiments of an e-reading device 300 capable of detecting water, debris or other extraneous objects, in accordance with some embodiments. The e-reading device 300 includes a housing 310 and a display screen 320. The e-reading device 300 can be substantially tabular or rectangular, so as to have a front surface that is substantially occupied by the display screen 320 so as to enhance content viewing. More specifically, the front surface of the housing 310 may be in the shape of a bezel surrounding the display screen 320. The display screen 320 can be part of a display assembly, and can be touch sensitive. For example, the display screen 320 can be provided as a component of a modular display assembly that is touch-sensitive and integrated with housing 310 during a manufacturing and assembly process.

A touch sensing region 330 is provided with at least a portion of the display screen 320. Specifically, the touch sensing region 330 may coincide with the integration of touch-sensors with the display screen 320. For some embodiments, the touch sensing region 330 may substantially encompass a surface of the display screen 320. Further, the e-reading device 300 can integrate one or more types of touch-sensitive technologies in order to provide touch-sensitivity on the touch sensing region 330 of the display screen 320. It should be appreciated that a variety of well-known touch sensing technologies may be utilized to provide touch-sensitivity at either the touch sensing region 330. By way of example, touch sensors used with the touch sensing region 330 can utilize resistive touch sensors; capacitive touch sensors (using self and/or mutual capacitance); inductive touch sensors; and/or infrared touch sensors.

For example, touch sensing region 330 can be employed using infrared sensors, which can detect an object contacting the surface of the display screen 320 when the presence of the object "cuts off" or otherwise interferes with an infrared beam being transmitted across the touch sensing region 330. In a variation, the touch sensing region 330 can be implemented using a grid pattern of electrical elements which can detect capacitance inherent in human skin. For example, the touch sensing region 330 can be implemented using a grid pattern of electrical elements which are placed over or just beneath the surface of the display screen 320, and which deform sufficiently on contact to detect touch from an object such as a finger. More generally, touch-sensing technologies for implementing the touch sensing region 330 can employ resistive touch sensors, capacitive touch sensors (using self and/or mutual capacitance), inductive touch sensors, and/or infrared sensors.

For some embodiments, e-reading device 300 may be configured to detect the presence of water (e.g., drops, splashes, and/or smears) on the touch sensing region 330 of the display screen 320. For example, the e-reading device 300 may implement an embodiment of the water sensing logic 217 described above in reference to FIG. 2. Specifically, the e-reading device 300 may determine that the display screen 320 is we if two or more separate and distinct interactions are concurrently detected via the touch sensing region 330. For example, the set of known gestures for the e-reading device 300 may include only single-contact gestures.

With reference to FIG. 3A, a droplet of water 301 and a splash of water 302 are present on the display screen 320. It should be noted that, while the splash 302 covers a greater surface area (e.g., and may thus interact with more touch sensors) than the droplet 301, the splash 302 and the droplet 301 may each be associated with a single interaction since each represents one contiguous object. The e-reading device 300 may activate a water sensing timer upon detecting the presence of both the droplet 301 and the splash 302 concurrently on the touch sensing region 330. For example, the water sensing timer may then count down (e.g., for a predetermined duration) for as long as at least one of the droplet 301 and/or the splash 302 remains in contact with the touch sensing region 330. Once the water sensing timer times out (e.g., the countdown reaches zero), the e-reading device 300 may determine that the display screen 320 is wet. For some embodiments, the e-reading device 300 may further adjust one or more device settings upon determining that the display screen 320 is wet.

With reference to FIG. 3B, only the droplet of water 301 is present on the display screen 320. The droplet of water 301, by itself, may not trigger the water sensing timer of the e-reading device 300 because the device 300 may interpret contact by the droplet 301 as a tapping and/or tap-and-hold user interaction (e.g., which may be associated with a particular user input). However, the water sensing timer may be activated once a user interacts with the e-reading device 300. For example, the e-reading device 300 may initiate the water sensing timer upon detecting a user interaction 305 (e.g., corresponding to finger tap, swipe, or other gesture) with the touch sensing region 330 while the droplet 301 is concurrently present. Then, even if the user interaction 305 is no longer detected (e.g., the user's finger is subsequently lifted off), the water sensing timer may continue to count down (e.g., for the predetermined duration) as long as the droplet 301 remains in contact with the touch sensing region 330. Once the water sensing timer times out, the e-reading device 300 may determine that the display screen 320 is wet. For some embodiments, the e-reading device 300 may further adjust one or more device settings upon determining that the display screen 320 is wet.

Figure 4:
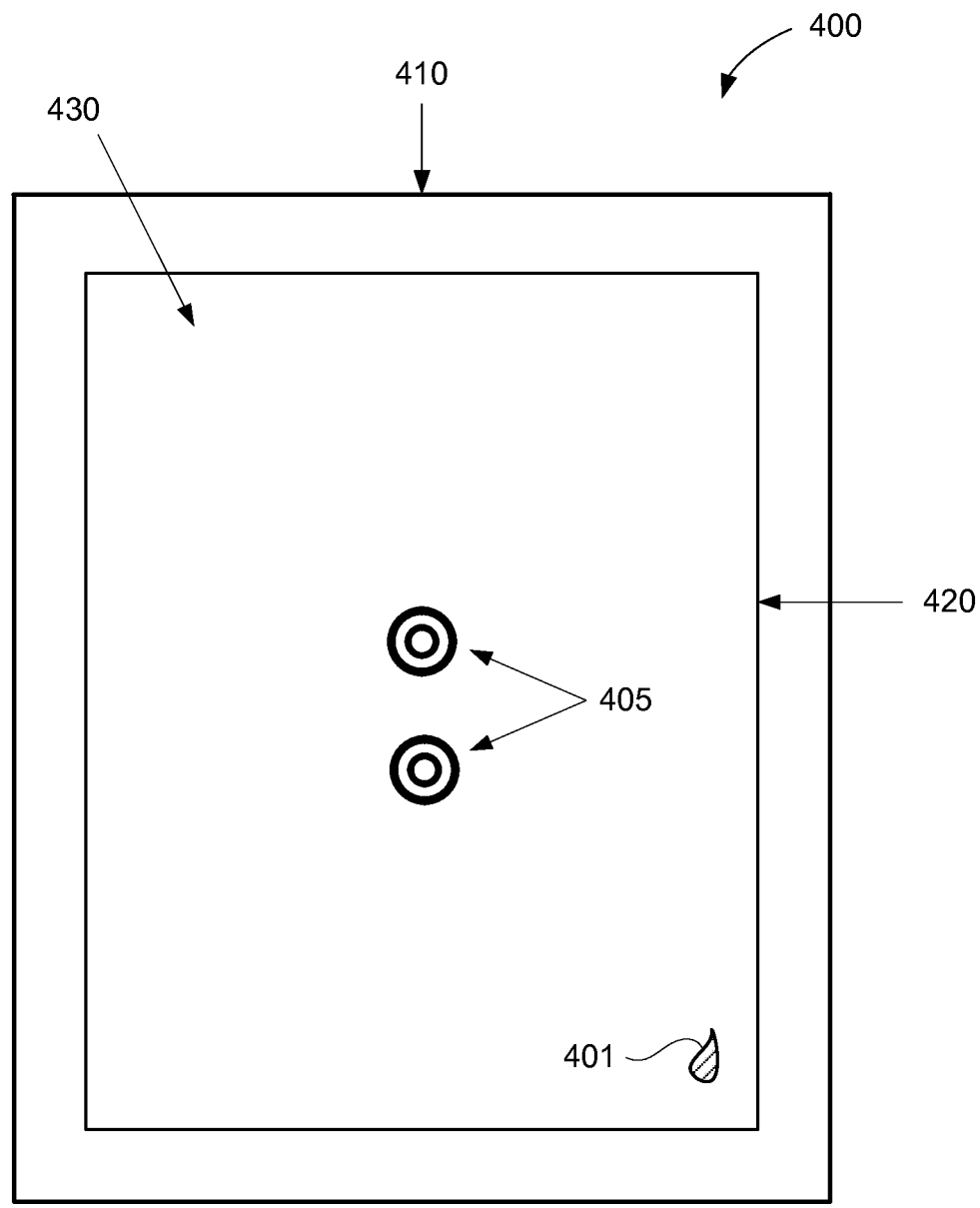
FIG. 4 illustrates an embodiment of an e-reading device capable of detecting water, in accordance with another embodiment.

FIG. 4 illustrates an embodiment of an e-reading device 400 capable of detecting water, debris or other extraneous objects, in accordance with another embodiment. The e-reading device 400 includes a housing 410 and a display screen 420. The display screen 420 can be part of a display assembly, and can be touch sensitive. A touch sensing region 430 is provided with at least a portion of the display screen 420. Specifically, the touch sensing region 430 may coincide with the integration of touch-sensors with the display screen 420. For simplicity, it may be assumed that the housing 410, display screen 420, and touch sensing region 430 are functionally similar (if not identical) to the housing 310, display screen 320, and touch sensing region 330, respectively, of FIGS. 3A-3B.

For some embodiments, the e-reading device 400 may be configured to detect the presence of water on the touch sensing region 430 of the display screen 420. For example, the e-reading device 400 may implement an embodiment of the water sensing logic 217 described above in reference to FIG. 2. Specifically, the e-reading device 400 may determine that the display screen 420 is we if three or more separate and distinct interactions are concurrently detected via the touch sensing region 430. For example, in contrast with e-reading device 300, the set of known gestures for the e-reading device 400 may include not only single-contact gestures but also multi-contact gestures (e.g., pinching, multi-finger tapping, multi-finger swiping etc.) that involve the use of two fingers concurrently in contact with the surface of the display screen 420.

In the example shown, only a single droplet of water 401 is present on the display screen 420. As described above, the e-reading device 400 may not detect the droplet of water 401 by itself (e.g., because the droplet 401 contacting the touch sensing region 430 may be interpreted as a tapping and/or tap-and-hold user interaction). Moreover, the e-reading device 400 also may not detect the droplet of water 401 in the presence of a single-contact user interaction (e.g., such as the user interaction 305 shown in FIG. 3B) since the two points of contact may be interpreted by the device 400 as a particular type of user input. However, the e-reading device 400 may activate a water sensing timer upon detecting a subsequent multi-contact user interaction (e.g., corresponding to a pinching, multi-finger tapping, or multi-finger swiping input) while the droplet 401 remains in contact with the touch sensing region 430. Moreover, the water sensing timer may continue to count down (e.g., for a predetermined duration), even if the user interaction 307 is no longer detected, as long as the droplet 401 remains in contact with the touch sensing region 430. Once the water sensing timer times out, the e-reading device 400 may determine that the display screen 420 is wet. For some embodiments, the e-reading device 400 may further adjust one or more device settings upon determining that the display screen 420 is wet.

While the examples of FIGS. 3A-3B and FIG. 4 illustrate specific examples in which multiple concurrent interactions with the touch sensing region of a display screen may be used to detect the presence of water, embodiments herein are not limited to these examples. More generally, an e-reading device may be configured to detect the presence of water in response to detecting any interactions that fall outside the set of known interactions and/or gestures for the device.

Water Detection Functionality

Figure 5:
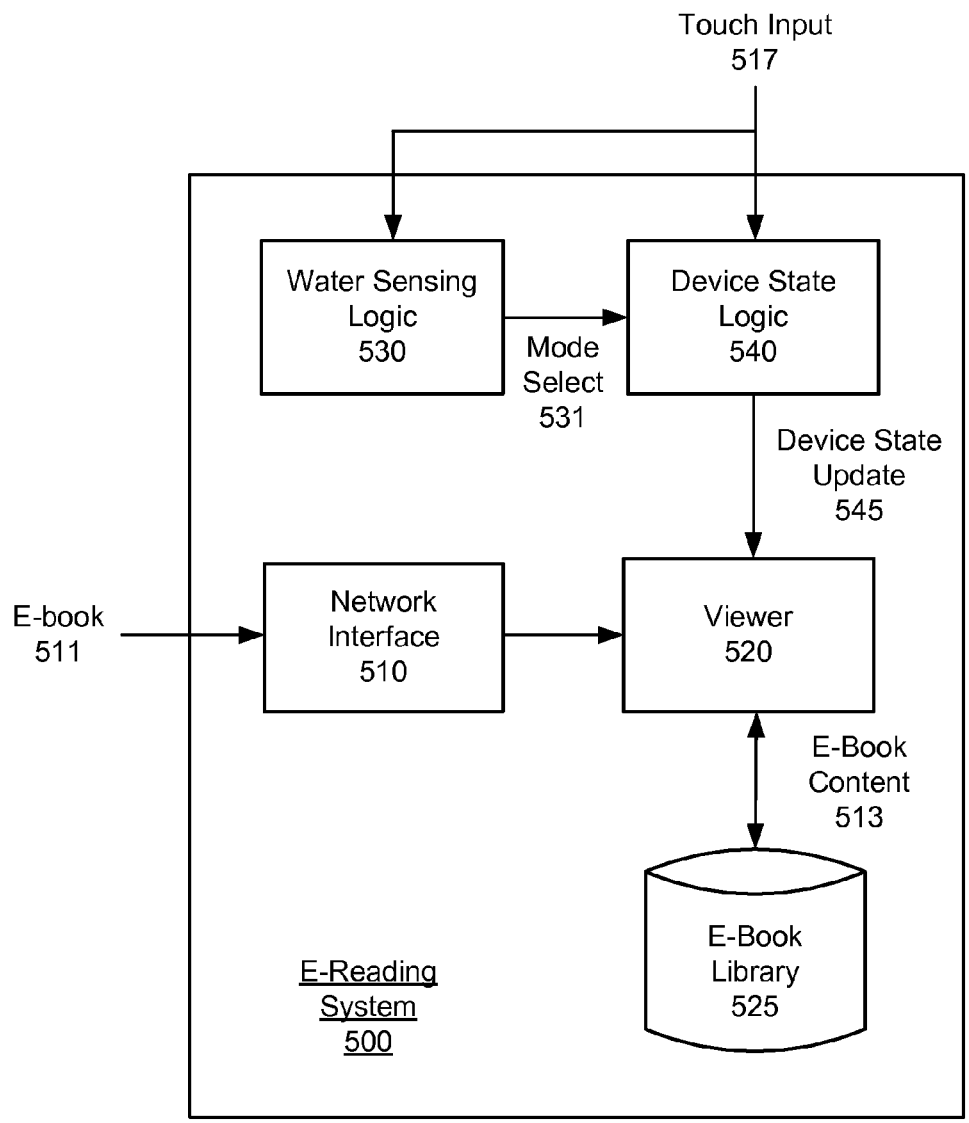
FIG. 5 illustrates an e-reading system for displaying e-book content, according to one or more embodiments.

FIG. 5 illustrates an e-reading system 500 for displaying e-book content, according to one or more embodiments. An e-reading system 500 can be implemented as, for example, an application or device, using components that execute on, for example, an e-reading device such as shown with examples of FIGS. 1, 2, 3A-3B, and 4. Furthermore, an e-reading system 500 such as described can be implemented in a context such as shown by FIG. 1, and configured as described by an example of FIG. 2, FIGS. 3A-3B, and/or FIG. 4.

In an example of FIG. 5, a system 500 includes a network interface 510, a viewer 520, water sensing logic 530, and device state logic 540. As described with an example of FIG. 1, the network interface 510 can correspond to a programmatic component that communicates with a network service in order to receive data and programmatic resources. For example, the network interface 510 can receive an e-book 511 from the network service that the user purchases and/or downloads. E-books 511 can be stored as part of an e-book library 525 with memory resources of an e-reading device (e.g., see memory 250 of e-reading device 200).

The viewer 520 can access e-book content 513 from a selected e-book, provided with the e-book library 525. The e-book content 513 can correspond to one or more pages that comprise the selected e-book. The viewer 520 renders one or more pages on a display screen at a given instance, corresponding to the retrieved e-book content 513. The page state can correspond to a particular page, or set of pages that are displayed at a given moment.

The device state logic 540 can be provided as a feature or functionality of the viewer 520. Alternatively, the device state logic 540 can be provided as a plug-in or as independent functionality from the viewer 520. The device state logic 540 can signal device state updates 545 to the viewer 520. The device state update 545 can cause the viewer 520 to change or after its current display state. For example, the device state logic 540 may be responsive to touch inputs 517 by signaling device state updates 545 corresponding to page transitions (e.g., single page transition, multi-page transition, or chapter transition).

Further, in specifying the device state update 545, the device state logic 540 can also provide instructions for a device shutoff, display shutoff, and/or screen saver. The device state update 545 for a device shutoff causes the entire system 500, including the viewer 520, to shut down and/or power off. The device state update 545 for a display shutoff causes only the viewer 520 to power off, thus placing the system 500 in a "sleep" mode. Further, the device state update 545 for a screen saver causes a screen saver to be displayed on the viewer 520. It should be noted that other device state updates 545 may also be provided such as, for example, launching and/or closing a book, application, menu, or sub-menu.

The water sensing logic 530 can be provided as a feature or functionality of the device state logic 540. Alternatively, the water sensing logic 530 can be provided as a plug-in or as independent functionality from the viewer 540. The water sensing logic 530 can detect the presence of water (and/or other extraneous objects) on the surface of the viewer 520. More specifically, the water sensing logic 530 may be response to touch inputs 517 by selectively outputting a mode select signal 531 to the device state logic 540. For example, the water sensing logic 530 may determine that the viewer 520 is we based on a number of touch-based interactions detected via touch sensors provided with the viewer 520 (e.g., and received as touch inputs 517) and/or a contact duration associated with each interaction (e.g., a "magnitude" of each of the touch inputs 517).

For some embodiments, the water sensing logic 530 may determine that the viewer 520 is we upon receiving a touch input 517 that is not a known input for the e-reading system 500 (e.g., the touch input 517 cannot be properly interpreted by the device state logic 540). For other embodiments, the water sensing logic 530 may determine that the viewer 520 is we if the touch input 517 is maintained for a duration longer than a threshold duration. Still further, for some embodiments, the water sensing logic 530 may determine that the viewer is we only if the touch input 517 is not a known input and persists beyond the threshold duration.

The mode select signal 531 instructs the device state logic 540 to operate in a "dry" mode or a "wet" mode. For example, the device state logic 540 may operate in the dry mode for as long as the mode select signal 531 is deasserted. However, upon determining that the viewer 520 is wet, the water sensing logic 530 may assert the mode select signal 531 to operate the device state logic 540 in the we mode. For some embodiments, assertion of the mode select signal 531 may cause the device state logic 540 to adjust one or more settings of the e-reading system 500. For example, when operating in the we mode, the e-reading system 500 may power off the viewer 520 and/or other hardware components, after one or more device configurations, and/or reconfigure one or more input responses of the device state logic 540. More specifically, some or all of these adjustments may be carried out by the device state logic 540, for example, by generating corresponding device state updates 545.

Methodology

Figure 6:
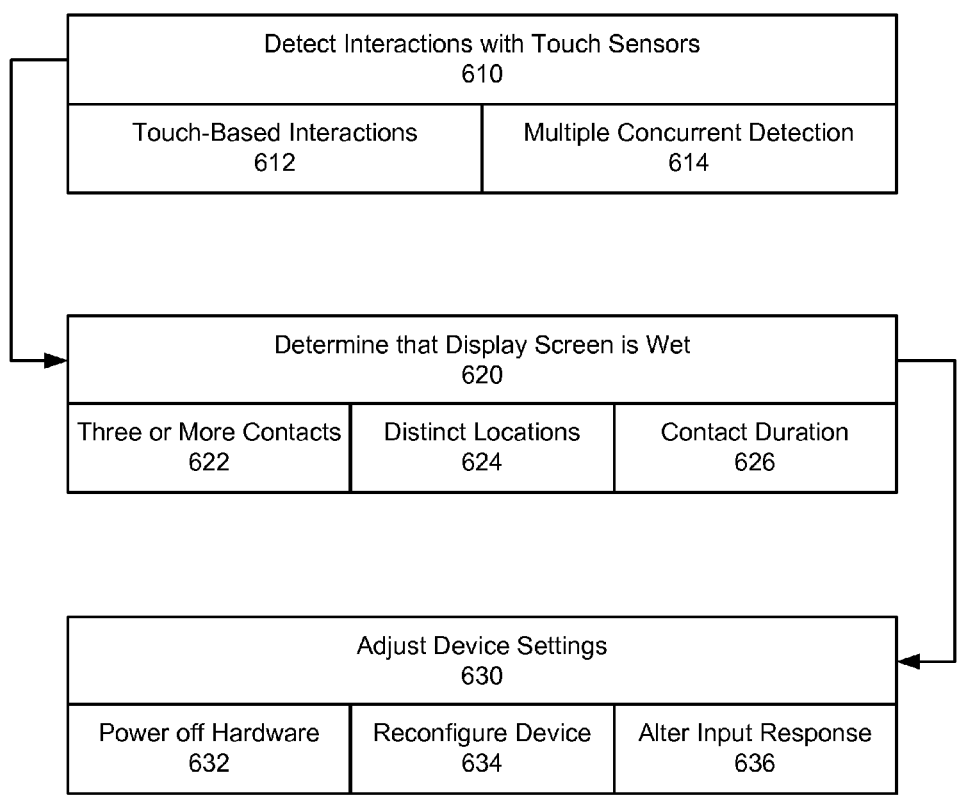
FIG. 6 illustrates a method of operating an e-reading device that is capable of detecting water, according to one or more embodiments.

FIG. 6 illustrates a method of operating an e-reading device that is capable of detecting water, according to one or more embodiments. In describing an example of FIG. 6, reference may be made to components such as described with FIGS. 2-4 for purposes of illustrating suitable components for performing a step or sub-step being described.

With reference to an example of FIG. 2, the e-reading device 200 may detect interactions with touch sensors provided (or otherwise associated) with a display of the e-reading device 200 (610). For example, the interactions may be detected by the touch sensor components 240. More specifically, the placement of the sensor components 240 may coincide with one or more touch sensing regions on the surface of the display 230. For some embodiments, the touch sensors 240 may detect touch-based interactions on the surface of the display 230 (612).

For example, as shown in FIGS. 3A and 3B, the touch-based interactions may correspond with water, a finger, and/or other objects making contact with the surface of the display screen 320. Further, for some embodiments, the touch sensors 240 may detect multiple interactions, concurrently, on the surface of the display 230 (614). For example, as shown in FIGS. 3A and 3B, contact from the water droplet 301 may be detected independent of the water splash 302 and/or the user interaction 305.

The e-reading device 200 may subsequently determine that the screen is we based on the detected interactions (620). For example, the processor 210, in executing the water sensing logic 217, may determine that the display 230 is we in response to receiving an input 231 that is not a known input for the e-reading device 200. For some embodiments, the processor 210 may determine that the display 230 is we if the received input 231 corresponds with three or more contacts detected by the touch sensors 240 (622) at separate and distinct locations on a surface of the display 230 (624), and at least one of the contacts is maintained for a threshold duration (626).

For example, as shown in FIG. 4, the touch sensing region 430 of the display screen 420 may simultaneously detect contact from the water droplet 401 and a multi-contact user interaction 405. Because three-finger interactions do not correlate with any known user input, the e-reading device 400 may activate a water sensing timer upon detecting the multi-contact interaction. More specifically, the e-reading device 400 may determine that the display screen 320 is we after the water sensing timer expires (e.g., after sensing the water droplet 401 in contact with a corresponding region of the display screen 320 for at least the threshold duration).

The e-reading device 200 may further adjust one or more device settings after determining that the display screen is we (630). For example, the processor 210, in executing the water sensing logic 217, may configure the device in a we mode. More specifically, the we mode may include a set of parameters to prevent damage to the e-reading device 200 and/or enable the e-reading device 200 to be operable even in the presence of water. For some embodiments, the processor 210 may power off one or more hardware components of the e-reading device 200 (632), reconfigure one or more device settings or performance parameters (634), and/or after one or more input responses of the e-reading device (636).

For example, the e-reading device 200 may power off one or more hardware components to prevent water from short-circuiting or otherwise damaging the device 200. Alternatively, the e-reading device 200 may reconfigure one or more device components (e.g., such as disabling the touch sensor coinciding with the region of the display 230 which is in contact with the water) to prevent the water from interfering with a "normal" operation of the device 200. Similarly, the e-reading device 200 may alter one or more input responses to (e.g., such as modifying the set of known user inputs) to enable the device 200 to operate in a manner that is optimized for we conditions.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
    a display assembly including a screen;
    a housing that at least partially circumvents the screen so that the screen is viewable;
    a set of infrared sensors provided with the display assembly; and
    a processor provided within the housing, the processor is configured to:
        detect a plurality of interactions with a surface of the screen of the display assembly via the set of infrared sensors,
        determine, via the set of infrared sensors and based on the plurality of interactions, a presence of extraneous objects on the surface of the screen of the display assembly, and
        in response to determining the presence of extraneous objects on the surface of the screen, temporarily reconfigure one or more device components to prevent the presence of extraneous objects from interfering with operation of the device, wherein temporarily reconfiguring the one or more device components includes disabling recognition of a first set of predetermined gestures and enabling a second set of predetermined gestures.

2. The computing device of claim 1, wherein the processor is further configured to determine the presence of extraneous objects by:
    determining that the plurality of interactions do not correlate with a known user input.

3. The computing device of claim 1, wherein the processor is further configured to:
    determine a number of interactions that are detected, concurrently, via the set of infrared sensors.

4. The computing device of claim 3, wherein the processor is configured to determine the presence of extraneous objects based, at least in part, on the number of interactions that are concurrently detected via the set of infrared sensors.

5. The computing device of claim 4, wherein the processor determines that than an extraneous object is present on the surface of the screen if three or more interactions are detected, concurrently, via the set of infrared sensors.

6. The computing device of claim 5, wherein the three or more interactions are detected via respective infrared sensors positioned at distinct regions of the display assembly.

7. The computing device of claim 1, wherein the processor is further configured to:
   determine a contact duration associated with each of the plurality of interactions, wherein each contact duration represents a length of time for which a corresponding object is in continuous contact with a particular region of the screen when interacting with the set of infrared sensors.

8. The computing device of claim 7, wherein the processor is configured to determine the presence of extraneous objects based, at least in part, on the contact duration associated with each of the plurality of interactions.

9. The computing device of claim 8, wherein the processor determines that an extraneous object is present on the surface of the screen if the contact duration for at least one of the plurality of interactions exceeds a threshold duration.

10. The computing device of claim 1, wherein the processor is further configured to:
    perform one or more operations to enhance viewability of content appearing on the display assembly to mitigate or overcome the presence of extraneous objects on the surface of the screen.

11. The computing device of claim 1, wherein reconfiguring the one or more device components includes disabling one or more touch sensors coinciding with one or more regions of the display assembly which are in contact with water.

12. The computing device of claim 1, wherein one or more hardware components are powered off in response to determining the presence of extraneous objects.

13. The computing device of claim 1, wherein the processor is further configured to:
    activate a water sensing timer in response to the plurality of interactions via the set of infrared sensors, wherein the presence of extraneous objects on the surface of the screen is determined when the water sensing timer times out.

14. The computing device of claim 13, wherein the water sensing timer continues to count down when the plurality of interactions is no longer detected.

15. A method for operating a computing device, comprising:
    detecting a plurality of interactions with a surface of a screen via a set of infrared sensors provided with a display assembly of the computing device;
    determining, based on the plurality of interactions, a presence of extraneous objects on a surface of the screen of the display assembly; and
    in response to determining the presence of extraneous objects on the surface of the screen, temporarily reconfiguring one or more device components to prevent the presence of extraneous objects from interfering with operation of the device, wherein temporarily reconfiguring the one or more device components includes disabling recognition of a first set of predetermined gestures and enabling a second set of predetermined gestures.

16. The method of claim 15, wherein determining the presence of extraneous objects comprises:
    determining that the plurality of interactions do not correlate with a known user input.

17. The method of claim 15, further comprising:
    determining a number of interactions that are detected, concurrently, via the set of infrared sensors.

18. The method of claim 17, wherein determining the presence of extraneous objects comprises:
    determining the presence of extraneous objects based, at least in part, on the number of interactions that are concurrently detected via the set of infrared sensors.

19. The method of claim 18, wherein determining the presence of extraneous objects further comprises:
    determining that an extraneous object is present on the surface of the screen if three or more interactions are detected, concurrently, via the set of infrared sensors.

20. The method of claim 19, further comprising:
    detecting the three or more interactions via respective infrared sensors positioned at distinct regions of the display assembly.

21. The method of claim 15, further comprising:
    determining a contact duration associated with each of the plurality of interactions, wherein each contact duration represents a length of time for which a corresponding object is in continuous contact with a particular region of the screen when interacting with the set of infrared sensors.

22. The method of claim 21, wherein determining the presence of extraneous objects comprises:
    determining the presence of extraneous objects based, at least in part, on the contact duration associated with each of the plurality of interactions.

23. The method of claim 22, wherein determining the presence of extraneous objects further comprises:
    determining an extraneous object is present on the surface of the screen if the contact duration for at least one of the plurality of interactions exceeds a threshold duration.

24. A non-transitory computer-readable medium for storing instructions, when executed by one or more processors, causes the one or more processors to:
    detect a plurality of interactions with a surface of a screen via a set of infrared sensors provided with a display assembly of a computing device on which the instructions are executed;
    determine, based on the plurality of interactions, a presence of extraneous objects on a surface of the screen of the display assembly; and
    in response to determining the presence of extraneous objects on the surface of the screen, temporarily reconfigure one or more device components to prevent the presence of extraneous objects from interfering with operation of the device, wherein temporarily reconfiguring the one or more device components includes disabling recognition of a first set of predetermined gestures and enabling a second set of predetermined gestures.

* * * * *